(12) United States Patent
Gittins et al.

(10) Patent No.: US 7,765,437 B2
(45) Date of Patent: Jul. 27, 2010

(54) FAILURE TREND DETECTION AND CORRECTION IN A DATA STORAGE ARRAY

(75) Inventors: Robert Sherwood Gittins, Woodland Park, CO (US); Robert Michael Lester, Colorado Springs, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 170 days.

(21) Appl. No.: 11/867,543

(22) Filed: Oct. 4, 2007

(65) Prior Publication Data

US 2008/0244316 A1 Oct. 2, 2008

Related U.S. Application Data

(63) Continuation of application No. 11/070,942, filed on Mar. 3, 2005, now abandoned.

(51) Int. Cl.
G06F 11/00 (2006.01)
(52) U.S. Cl. ........................................................ 714/47
(58) Field of Classification Search ................... 714/47
See application file for complete search history.

(56) References Cited

U.S. PATENT DOCUMENTS

| 5,450,609 | A | * | 9/1995 | Schultz et al. .............. 711/114 |
|---|---|---|---|---|
| 5,721,816 | A | | 2/1998 | Kusbel et al. |
| 5,774,285 | A | | 6/1998 | Kassab et al. |
| 6,249,890 | B1 | | 6/2001 | Ukani et al. |
| 6,401,214 | B1 | | 6/2002 | Li |
| 6,415,189 | B1 | | 7/2002 | Hajji |
| 6,442,711 | B1 | * | 8/2002 | Sasamoto et al. ............. 714/38 |
| 6,460,151 | B1 | | 10/2002 | Warwick et al. |
| 6,606,210 | B1 | | 8/2003 | Coker et al. |
| 6,611,393 | B1 | | 8/2003 | Nguyen et al. |
| 6,732,233 | B2 | * | 5/2004 | Smith ......................... 711/114 |
| 6,738,757 | B1 | | 5/2004 | Wynne et al. |
| 6,760,174 | B2 | | 7/2004 | Forehand et al. |
| 6,771,440 | B2 | | 8/2004 | Smith |
| 6,832,236 | B1 | | 12/2004 | Hamilton, II et al. |
| 2002/0053046 | A1 | * | 5/2002 | Gray et al. .................... 714/42 |
| 2003/0182136 | A1 | | 9/2003 | Horton |
| 2003/0221057 | A1 | * | 11/2003 | Smith et al. ................. 711/114 |
| 2004/0051988 | A1 | | 3/2004 | Jing et al. |
| 2004/0103246 | A1 | | 5/2004 | Chatterjee et al. |
| 2004/0172082 | A1 | * | 9/2004 | Ferek-Petric .................. 607/27 |
| 2005/0060618 | A1 | * | 3/2005 | Guha ........................... 714/54 |
| 2006/0107013 | A1 | * | 5/2006 | Ripberger ................... 711/170 |
| 2007/0079170 | A1 | * | 4/2007 | Zimmer et al. ................. 714/6 |
| 2008/0256397 | A1 | * | 10/2008 | Smith .......................... 714/47 |

* cited by examiner

*Primary Examiner*—Bryce P Bonzo
(74) *Attorney, Agent, or Firm*—Fellers, Snider, et al.

(57) ABSTRACT

A plurality of data storage devices are arranged to form a multi-device array space, and a controller controls access to the array space. The controller is configured to index sets of operational performance data from the plurality of data storage devices into a unified data log. The controller further detects a failure trend of one or more data storage devices by analyzing at least one of a vertical block of data and a horizontal block of data in the unified data log. The vertical data block of data is associated with one of the data storage devices at a plurality of indices. The horizontal block of data is associated with a plurality of the data storage devices at an index.

20 Claims, 4 Drawing Sheets

FAILURE TREND DETECTION AND CORRECTION IN A DATA STORAGE ARRAY

RELATED APPLICATIONS

This is a continuation of application Ser. No. 11/070,942 filed on Mar. 3, 2005.

FIELD OF THE INVENTION

The claimed invention relates generally to the field of data storage systems and more particularly, but not by way of limitation, to an apparatus and method for detecting and correcting parametric failure trends in a data storage array.

BACKGROUND

Multi-device arrays (MDAs) are relatively large data space storage systems comprising a number of data storage devices, such as hard disc drives (HDDs), that are grouped together to provide an inter-device addressable memory space. MDAs are increasingly used in a wide variety of data intensive applications, web servers and other network accessed systems.

Individual data storage devices can be equipped with routines that monitor various operational parameters to provide early failure trend detection capabilities. This allows a user to take appropriate corrective action, such as reallocation or replacement of the associated data storage device, prior to a system failure event that adversely affects other portions of the system.

While operable, due to the continued increase in the reliance and use of MDAs, there remains a continual need in the manner in which failure trends can be analyzed and system failure events can be avoided.

SUMMARY OF THE INVENTION

Preferred embodiments of the present invention are generally directed to an apparatus and method for detecting and correcting parametric failure trends in a data storage array.

In some embodiments an apparatus is provided having a plurality of data storage devices arranged to form a multi-device array space and a controller that controls access to the array space. The controller is configured to index sets of operational performance data from the plurality of data storage devices into a unified data log. The controller further detects a failure trend of one or more data storage devices by analyzing at least one of a vertical block of data and a horizontal block of data in the unified data log. The vertical data block of data is associated with one of the data storage devices at a plurality of indices. The horizontal block of data is associated with a plurality of the data storage devices at an index.

In some embodiments an apparatus is provided having a plurality of data storage devices arranged to form a multi-device memory array space, and means for detecting a failure trend of one or more of the data storage devices by indexing sets of operational performance data from the plurality of data storage devices and analyzing subset blocks of the indexed data.

In some embodiments a method is provided including the steps of arranging a plurality of data storage devices to form a multi-device memory array space; indexing sets of operational performance data from the plurality of data storage devices into a unified data log; and analyzing at least one of a vertical block of data in the unified data log associated with one of the data storage devices at a plurality of indices and a horizontal block of data in the unified data log associated with a plurality of the data storage devices at an index to detect a failure trend in one or more of the data storage devices.

These and various other features and advantages which characterize the claimed invention will become apparent upon reading the following detailed description and upon reviewing the associated drawings.

DETAILED DESCRIPTION

Figure 1:
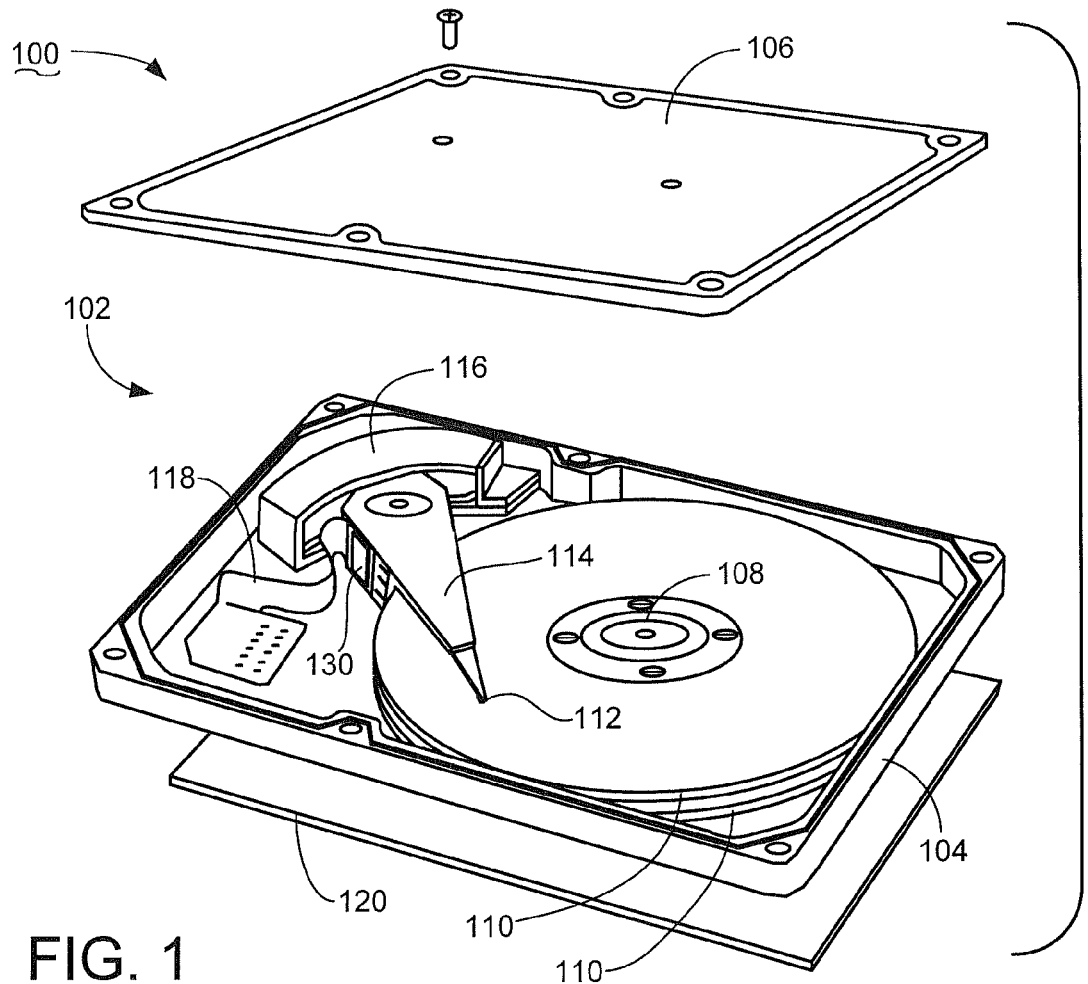
FIG. 1 is an exploded view of a data storage device constructed and operated in accordance with preferred embodiments of the present invention.

FIG. 1 shows an exploded view of a data storage device 100. The device 100 is preferably characterized as a 3.5 inch form factor hard disc drive of the type used to store and retrieve computerized data, but such is not limiting to the scope of the claimed subject matter.

The device 100 includes a rigid, environmentally controlled housing 102 formed from a base deck 104 and a top cover 106. A spindle motor 108 is mounted within the housing 102 to rotate a number of data storage media 110 at a relatively high speed.

Data are arranged on the media 110 in concentric tracks (not shown) which are accessed by a corresponding array of data transducing heads 112. The heads 112 (transducers) are supported by an actuator 114 and moved across the media surfaces by application of current to a voice coil motor, VCM 116. A flex circuit assembly 118 facilitates communication between the actuator 114 and control circuitry on an externally mounted printed circuit board, PCB 120.

Figure 2:
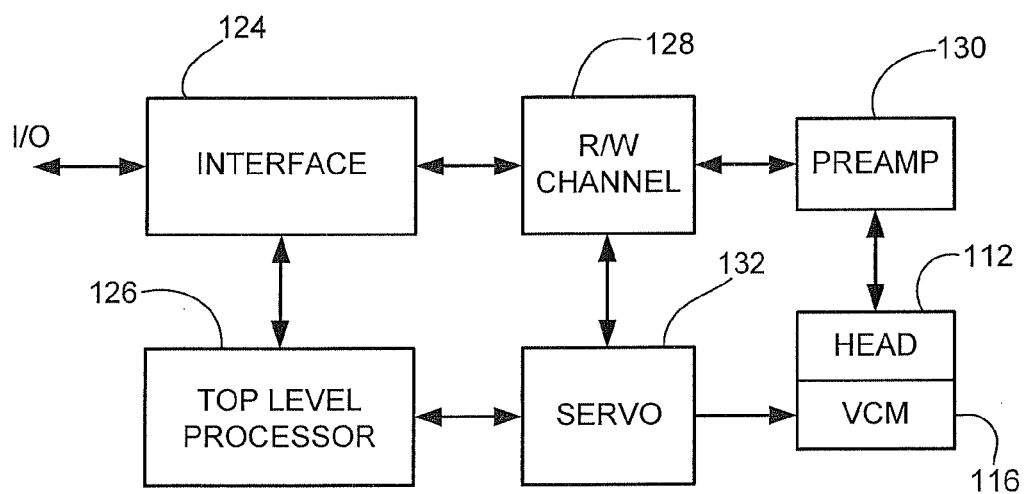
FIG. 2 is a generalized functional block diagram of the device of FIG. 1.

As shown in FIG. 2, the control circuitry preferably includes an interface circuit 124 which communicates with a host device using a suitable interface protocol. A top level processor 126 provides top level control for the device 100 and is preferably characterized as a programmable, general purpose processor with suitable programming to direct the operation of the device 100.

A read/write channel 128 operates in conjunction with a preamplifier/driver circuit (preamp) 130 to write data to and to recover data from the discs 108. A servo circuit 132 provides closed loop positional control for the heads 112.

It is contemplated that the processor 126 can include programming routines to carry out failure trend detection during operation of the device 100. As those skilled in the art will recognize, various parameters associated with the operation of the device 100 can be monitored over time, and variation in the values of these parameters can signal the onset of degraded performance or imminent failure. Parameters that can be monitored in this way include, but are not limited to read error rates, channel quality, head bias current magnitudes, servo positioning times, spindle motor speed, vibration levels, operational temperature levels, the occurrence of thermal asperities or other grown defects on the media, etc.

In one approach, preselected threshold levels for the various parameters are established. When an associated threshold is reached, the device 100 provides an alarm to the end user who can then take appropriate corrective action to ensure system data integrity, such as reallocation of the data stored by the device and replacement of the failed device with a new unit.

Figure 3:
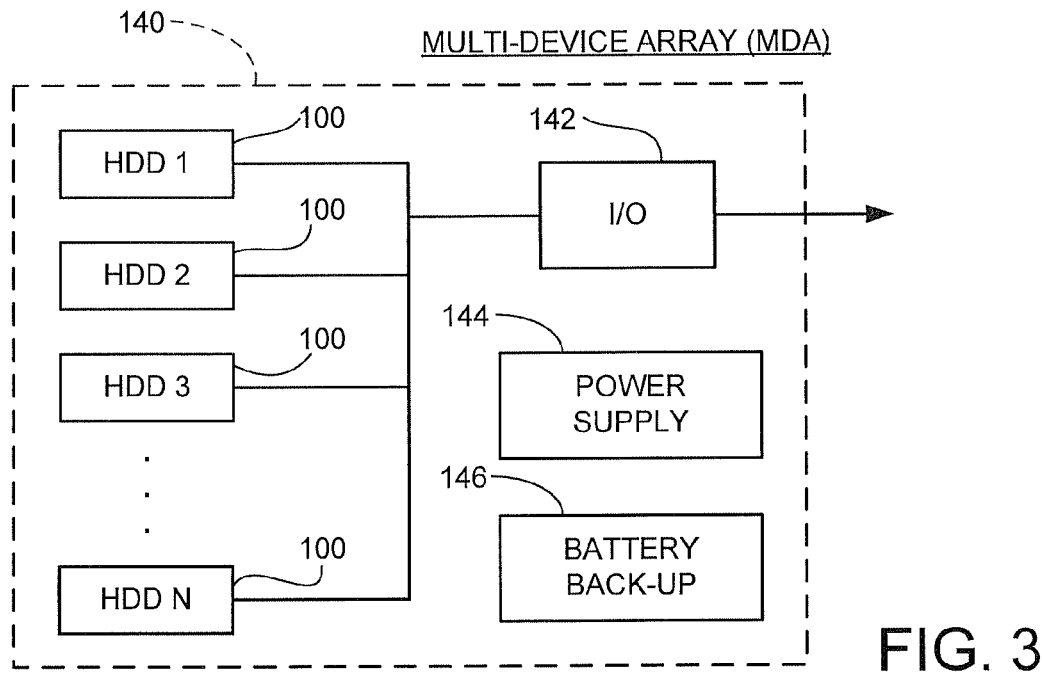
FIG. 3 illustrates relevant portions of a multi-disc array (MDA) formed from a plurality of data storage devices such as shown in FIGS. 1 and 2.

It is becoming increasingly common to incorporate multiple sets of the devices 100 into a multi-device array (MDA), such as generally represented at 140 in FIG. 3. The MDA 140 pools the data storage capacity of the devices 100 to provide a single, relatively large addressable memory space. Well-known RAID techniques are preferably employed to distribute the recording of data across the various devices 100.

The N devices 100 are arranged to communicate with a common input/output block 142. A power supply block 144 and a battery back-up supply 146 are included to meet the normal and standby requirements of the MDA 140.

Figure 4:
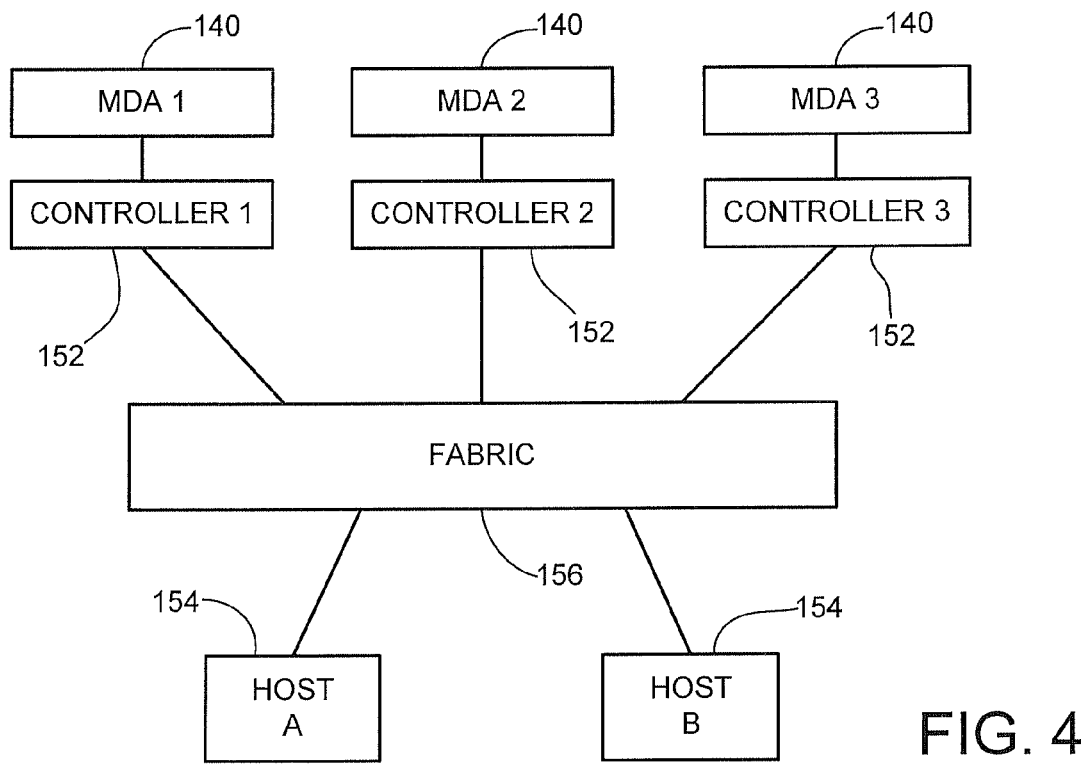
FIG. 4 represents a network system utilizing a number of the MDAs such as shown in FIG. 3.

Although not depicted in FIG. 4, it will be understood that the components are preferably arranged into a common housing so as to provide a single plug-and-play unit which can be incorporated into a rack or other system. Additional elements such as cooling fans and interconnection backplanes are omitted for clarity of illustration, and redundant sets of the components shown in FIG. 4 (e.g., two power supplies, two battery back-ups, etc.) are preferably incorporated into the MDA 140 to enhance system reliability and availability.

FIG. 4 illustrates a network 150 in which a number of MDAs such as 140 are incorporated. Each MDA 140 is shown to have an associated controller 152 which controls access to each respective MDA 140. Each controller 152 preferably includes a relatively powerful general purpose processor and a relatively large cache memory space to control large scale data transfers with the MDA 140.

Although not shown, preferably two controllers 152 and two MDAs 140 are operated in tandem at each location for redundancy. The controllers 152 communicate with a number of host computers 154 through a fabric 156, which can comprise the Internet, a wide area network, or other network connection system.

Figure 5:
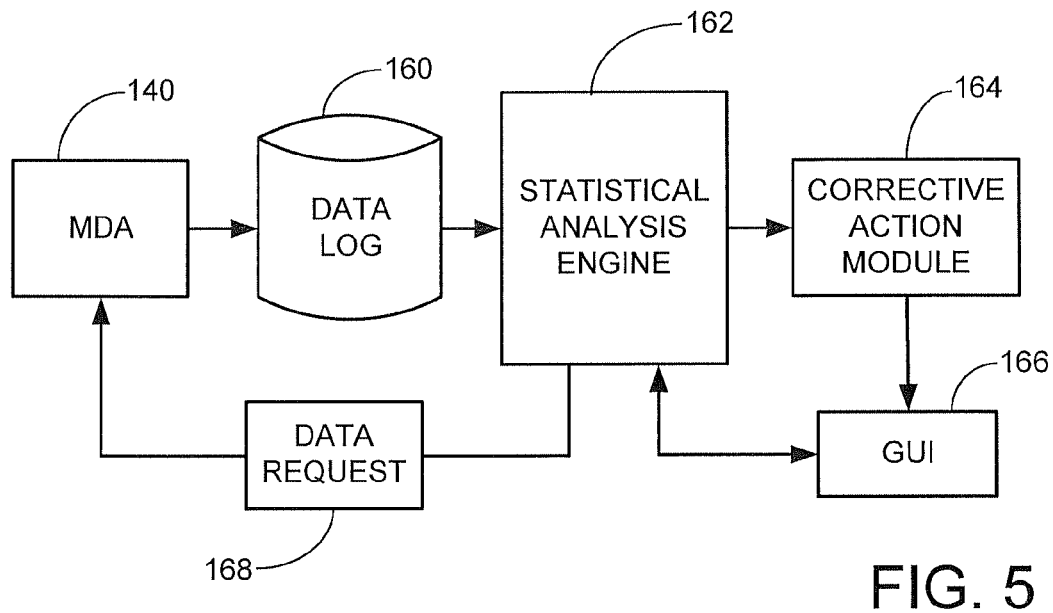
FIG. 5 provides a generalized functional block diagram of operation of a selected MDA/controller sub-system of FIG. 4 in accordance with preferred embodiments of the present invention.

FIG. 5 illustrates a preferred operational architecture of each controller/MDA combination from FIG. 4. As explained in greater detail below, operational parametric data from each of the devices 100 in the MDA 140 are accumulated by the controller 152 into a data log 160.

A statistical analysis engine 162 analyzes the data and, when appropriate, initiates a data storage specific corrective action event using a corrective action module 164. The module 164 interlaces with a GUI 166 (graphical user interface) to provide visual and/or audible alarm indicators and other outputs to a user. The GUI 166 further allows access to the engine 162 to initiate user-specific data requests and analyses. The engine 162 further provides parametric monitoring data requests via command block 168 to adjust the sampling criteria, that is the types and/or sampling frequency of parametric data supplied to the log 160, as required.

The log 160 is preferably stored in a designated portion of the non-volatile memory space provided by the devices 100 in the MDA 140. From here, the entire log or selected portions thereof are uploaded into the cache memory space of the controller 152 to allow access by the engine 162. Alternatively, separate provision of memory space (including a dedicated array) is provided accessible by the controller 152 to store the parametric data from the devices 100.

It is contemplated that the log 160 can take any number of forms, depending on the requirements of a given application. A particularly useful format is generally set forth by FIG. 6, which provides individual parametric data from each device 100 in separate "columns" using a common index (such as elapsed time).

Thus for example, the column for device 1 can comprise all of the data for a single parameter (e.g., channel quality) in historical sequence over time, with later obtained CQ measurements appended at the end. Similar data are provided in adjacent columns for each of the remaining devices 2-N. Separate "sheets" can be formed to track each of the different operational parameters being monitored.

Other constructs for the data log 160 are readily envisioned, however, including formats that group all or related subsets of correlated parameters into the same table, or that provide a different sheet per device. Regardless, the log represents historical parametric data across all of the relevant devices 100 in the MDA 140.

This facilitates the execution of a vertical analysis by the engine 162 upon data associated with a single one of the devices 100, as represented by vertical data block 170, as well as a horizontal analysis by the engine 162 across multiple devices, as represented by horizontal data block 172.

Figure 7:
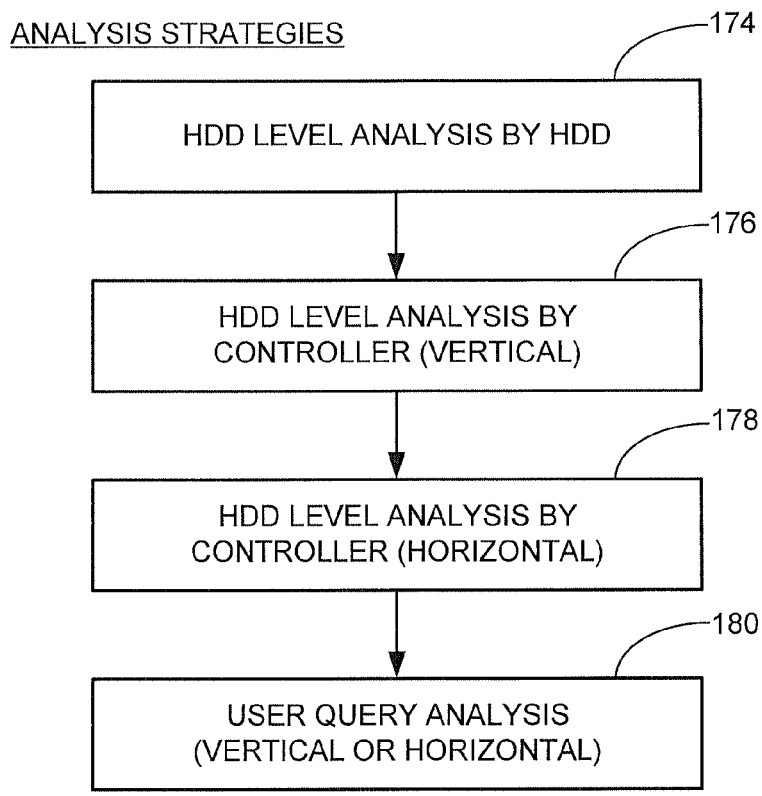
FIG. 7 provides a flow of alternative statistical analysis strategies carried out by the sub-system of FIG. 5.

A hierarchy of potential analysis modes is thus envisioned, as set forth by FIG. 7. In some preferred embodiments, the individual devices 100 continue as originally configured to carry out separate monitoring of selected parameters during operation. This is signified by block 174. Such operation is separately carried out by the local top level processor 130 (FIG. 2) in each device.

In this example, when a particular parameter is found to be out-of-bounds, an alarm indication can be transmitted via the local I/F block 124 to the MDA I/O block 142, which notifies the controller 152. The controller 152 takes the appropriate action, such as logging the event or notifying the user via the corrective action module 164 and GUI 166. Depending upon the severity of the event, the appropriate corrective action may be taken at the device level, by the device in response to a specific command control input by the controller, or by user intervention.

In addition to the foregoing operation, all of the parametric data collected and analyzed by the individual devices 100 are preferably forwarded to the data log 160 to accumulate the historical data into the log.

Another level of analysis provided in FIG. 7 is the aforementioned vertical analysis by the engine 162, depicted at block 176. Using the above example where the individual devices 100 continue to perform in situ parametric analysis, this provides a second level of verification capability. That is, the engine 162 can carry out the same analysis in tandem with the local processor 130, enhancing system reliability and reducing false positives.

The engine 162 can alternatively rely upon the local processors 130 to serve as first pass filter screens, so that alarms set by the individual devices 100 serve as inputs to the engine 162 to commence investigation and analysis at the controller level. In this case, the engine 162 applies advanced statistical analyses to the existing data, and may use heuristic methods to request additional data not previously supplied by the associated device 100 (i.e., greater frequency of samples, reporting of other available but not normally reported parameters, etc.) in order to evaluate the situation and arrive at a decision with regard to whether a failure trend has in fact been detected and what corrective action, if any, should be taken.

In another alternative embodiment, the localized parametric optimization at the individual device level is eliminated, such being carried out instead by the more powerful engine 162. In this case the devices 100 merely upload the associated run-time parametric data to the log with no or minimal analysis thereof.

An advantage of this particular approach is the simplification of the design and programming of the individual devices, since the power and resources required for such analysis can be eliminated from the design. It will be appreciated by those skilled in the art that such simplifications can result in a not insignificant cost savings per device, which when multiplied by the sheer volume of devices incorporated into the MDAs can result in significant cost savings and system availability advances.

Alternatively, the freeing of system resources at the individual device level on the analysis end can be used to budget greater amounts of data (more samples as well as greater numbers of parameters) to the data log 160 by the individual devices.

Accordingly, in this alternative approach the vertical analysis represented by block 176 is envisioned as replacing the localized parametric analysis performed by the individual devices 100 (block 174). As before, because of the greater processing power of the controller 152, more complex and computationally intensive statistical processes can be applied to the data than are presently available. Moreover, detection of an initial trend can result in tuned data requests via block 168 to the associated device 100 for more data to enhance the analysis.

Block 178 in FIG. 7 depicts the aforementioned horizontal analysis across multiple devices 100 in the MDA 140. This level of analysis is preferably performed in addition to the horizontal analyses of blocks 174 and/or 176, such as on a time or parameter basis. It will be noted that the horizontal analysis of block 178 involves performing an analysis on at least a subset of the data in the history log 160, with the subset associated with at least multiple ones of the devices 100 in the MDA 140 (i.e., spread across multiple devices, or all of the devices in the array as required).

User-specified queries and analyses initiated through the GUI 166 are depicted at block 180. It will be noted that the various blocks in FIG. 7 can be utilized singly or in combination, and the output of one can automatically trigger the execution of another.

Figure 8:
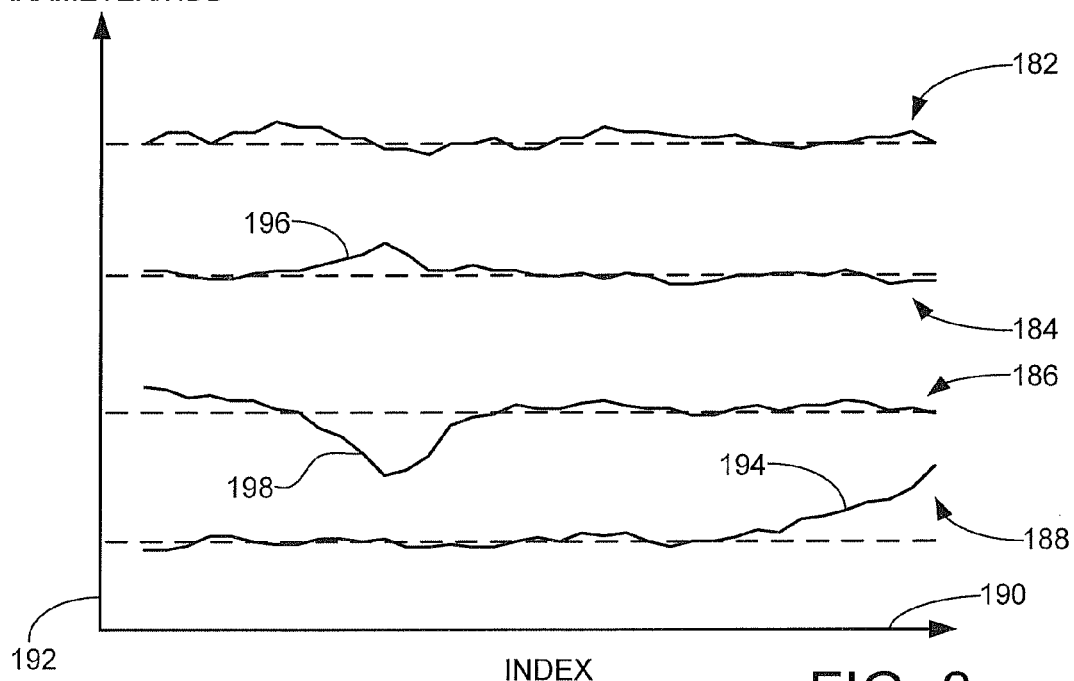
FIG. 8 graphically illustrates a number of parametric data sets to better set forth preferred operation of the sub-system of FIG. 5.

FIG. 8 illustrates one manner in which the analysis blocks can be advantageously utilized. FIG. 8 provides a generic series of parametric history curves 182, 184, 186 and 188, graphically plotted against an index x-axis 190 and a common amplitude y-axis 192. It will be recognized that graphical depiction of the parameter sets is not necessarily required by the engine 162 in order to carry out the associated processes, but such graphs facilitate the present discussion and can readily be provided to the user via the GUI 166, as desired.

In a first example, it will be contemplated that the curves 182, 184, 186 and 188 represent data for each of the devices 1, 2, 3 and N respectively associated with a particular parameter, in this case, error rate. The data are represented such that lower values are "better" and higher values are "worse," although such is merely one available formulation. Associated baseline values are denoted via broken lines.

It can be seen that a significant upward trend in error rate for device N (denoted locally at 194) can be readily detected, either by trend analysis (moving average, etc.) or via crossover of an associated threshold (not shown).

An increase in error rate in and of itself does not necessarily suggest a particular cause, but does allow immediate remedial corrective action to be taken, such as reallocation of the affected data, etc. so as to minimize the effects of the trend upon system performance. Further monitoring and diagnostics, however, can take place to isolate one or more causes, leading to elimination of the problem from the system. Exemplary corrective actions include decommissioning of a particular head/media combination, substitution of a particular device for a standby "spare" within the MDA, application of a different RAID or ECC level, performance of routine scheduled maintenance, etc.

Continuing with this example, it will be noted that analyzing the data across multiple devices within the MDA 140 provides further important information with regard to this event, namely, that only device N is presently experiencing the localized increase in error rate and the other devices are apparently not affected within the applicable time period. In other words, even at this point it appears that the failure event is isolated to the device N.

The reader may note that the same knowledge would appear to be available simply relying upon the separate, individual device level analysis of block 174, but this is not the case; the failure of any of the other devices in the array to identify an out-of-bounds condition trend is not the same as knowing globally what the specific data are for each of the devices at the same time. Accordingly, the unified data log approach provides superior analysis and corrective action operations even when the data event is isolated to a single device, and even when the same level of analysis is performed as would be performed at the individual device level.

Continuing with another example using FIG. 8, it will now be contemplated that each of the curves 182, 184, 186, 188 represent different parameters such as, for example, channel quality, servo qualification time, rotational vibration and off-track errors, respectively, for the same or different devices. In this case, inter-parametric correlations such as at 196 and 198 can be identified, allowing further insight into the inter-dependency of respective parameters. Time lag relationships can also be established such as, for example, the decrease at 198 inducing the corresponding increase at 194. The identification of such relationships can better isolate the true cause of a particular event.

For example, it might be determined that the device associated with curve 184 (device 2) is inducing the error in curve 188 (device N) by way of acting upon the device represented by curve 186 (device 3). Thus, adjustment or replacement of device 2 would resolve the operational difficulties experienced by devices 3 and N, and so on.

It will now be appreciated that the preferred embodiments of the present invention as set forth herein present advantages over the prior art. Using the data log 160 to accumulate historical data across a number of the devices 100 can provide cost savings and the freeing of system resources, deeper and global analysis of the parametric data on a per device basis, and analysis of the data across multiple devices.

Figure 6:
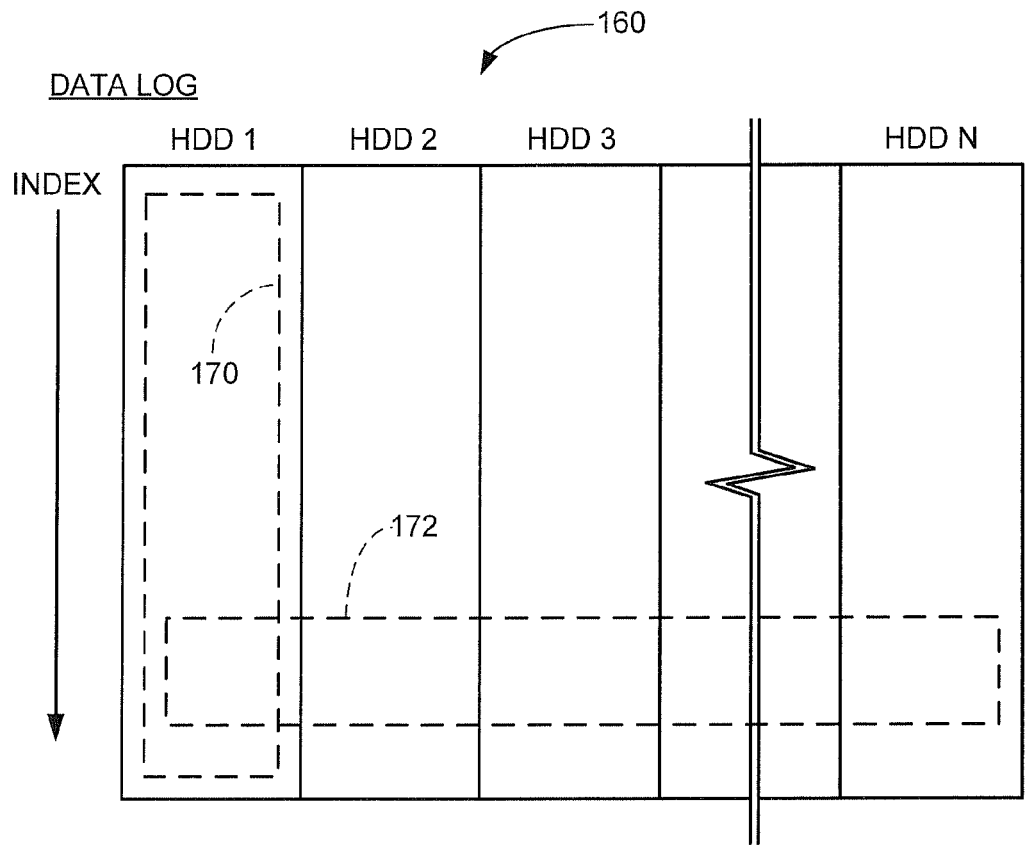
FIG. 6 shows a preferred format for the data log of FIG. 5.

For purposes of the appended claims, the recited first means will be understood to correspond to the controller structure set forth in FIG. 5, with the engine configured to carry out horizontal analyses as depicted in FIGS. 6 and 7.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular control environment without departing from the spirit and scope of the present invention.

In addition, although the embodiments described herein are directed to a multiple disc array that employs a number of hard disc drives to present a common addressable memory space, it will be appreciated by those skilled in the art that the claimed subject matter is not so limited and various other data storage systems, including optical based and solid state data storage devices, can readily be utilized without departing from the spirit and scope of the claimed invention.

What is claimed is:

1. An apparatus comprising:
a plurality of data storage devices arranged to form a multi-device array space, each of the plurality configured to analyze operational performance data to detect a failure trend of the respective data storage device; and
a controller which controls access to the array space, the controller configured to index the operational performance data from the plurality of data storage devices into a unified data log, to investigate the failure trend of one or more of the plurality of data storage devices by analyzing at least one of a vertical block of the operational performance data in the unified data log associated with one of the data storage devices at a plurality of indices and a horizontal block of the operational performance data in the unified data log associated with a plurality of the data storage devices at an index.

2. The apparatus of claim 1 wherein the controller is configured to sample failure trend data generated by each of the plurality of data storage devices according to a first sampling criteria, and the controller further configured to respond to values of indexed data in the unified data log by switching to a sampling of subsequent failure trend data generated by each of the plurality of data storage devices according to a different second sampling criteria.

3. The apparatus of claim 2 wherein the first and second sampling criteria define sampling according to different sampling frequencies.

4. The apparatus of claim 2 wherein the first and second sampling criteria define sampling different operational parameters.

5. The apparatus of claim 2 wherein the controller is configured to index the failure trend data sampled according to the second sampling criteria into the unified data log.

6. The apparatus of claim 2, wherein the controller comprises a statistical analysis engine which operates upon the data stored in the unified data log to trigger the switching from the first sampling criteria to the second sampling criteria.

7. The apparatus of claim 6, further comprising a graphical user interface in communication with the statistical analysis engine to facilitate user-specified analysis by the statistical analysis engine upon the data stored in the unified data log.

8. The apparatus of claim 1, wherein the unified data log is stored in the multi-device array space.

9. The apparatus of claim 1, wherein at least one of the plurality of data storage devices is characterized as a hard disc drive comprising a rotatable data storage medium accessed by a moveable transducer.

10. The apparatus of claim 1, further comprising a corrective action module which forwards an alarm indication to a user.

11. A method comprising:
operating a plurality of data storage devices arranged to form a multi-device array space, each of the plurality configured to analyze operational performance data to detect a failure trend of the respective data storage device; and
controlling access to the array space by indexing the operational performance data from the plurality of data storage devices into a unified data log, and investigating the failure trend of one or more of the plurality of data storage devices by analyzing at least one of a vertical block of the operational performance data in the unified data log associated with one of the data storage devices at a plurality of indices and a horizontal block of the operational performance data in the unified data log associated with a plurality of the data storage devices at an index.

12. The method of claim 11 wherein the controlling step is characterized by sampling failure trend data generated by each of the plurality of data storage devices according to a first sampling criteria, and responding to values of indexed data in the unified data log by switching to a sampling of subsequent failure trend data generated by each of the plurality of data storage devices according to a different second sampling criteria.

13. The method of claim 12 wherein the controlling step is characterized by the first and second sampling criteria defining sampling according to different sampling frequencies.

14. The method of claim 12 wherein the controlling step is characterized by the first and second sampling criteria defining sampling different operational parameters.

15. The method of claim 12 wherein the controlling step is characterized by statistically analyzing the data stored in the unified data log to trigger the switching from the first sampling criteria to the second sampling criteria.

16. The method of claim 15 wherein the controlling step is characterized by communicating results of the statistically analyzing step via a graphical user interface to facilitate user-specified analysis upon the data stored in the unified data log.

17. The method of claim 11 wherein the controlling step is characterized by indexing the failure trend data sampled according to the second sampling criteria into the unified data log.

18. The method of claim 11 wherein the controlling step is characterized by storing the unified data log in the multi-device array space.

19. The method of claim 11 wherein the controlling step is characterized by at least one of the plurality of data storage devices being a hard disc drive having a rotatable data storage medium accessed by a moveable transducer.

20. The method of claim 11 wherein the controlling step is characterized by sending an alarm indication to a user.

* * * * *